Figure 1:
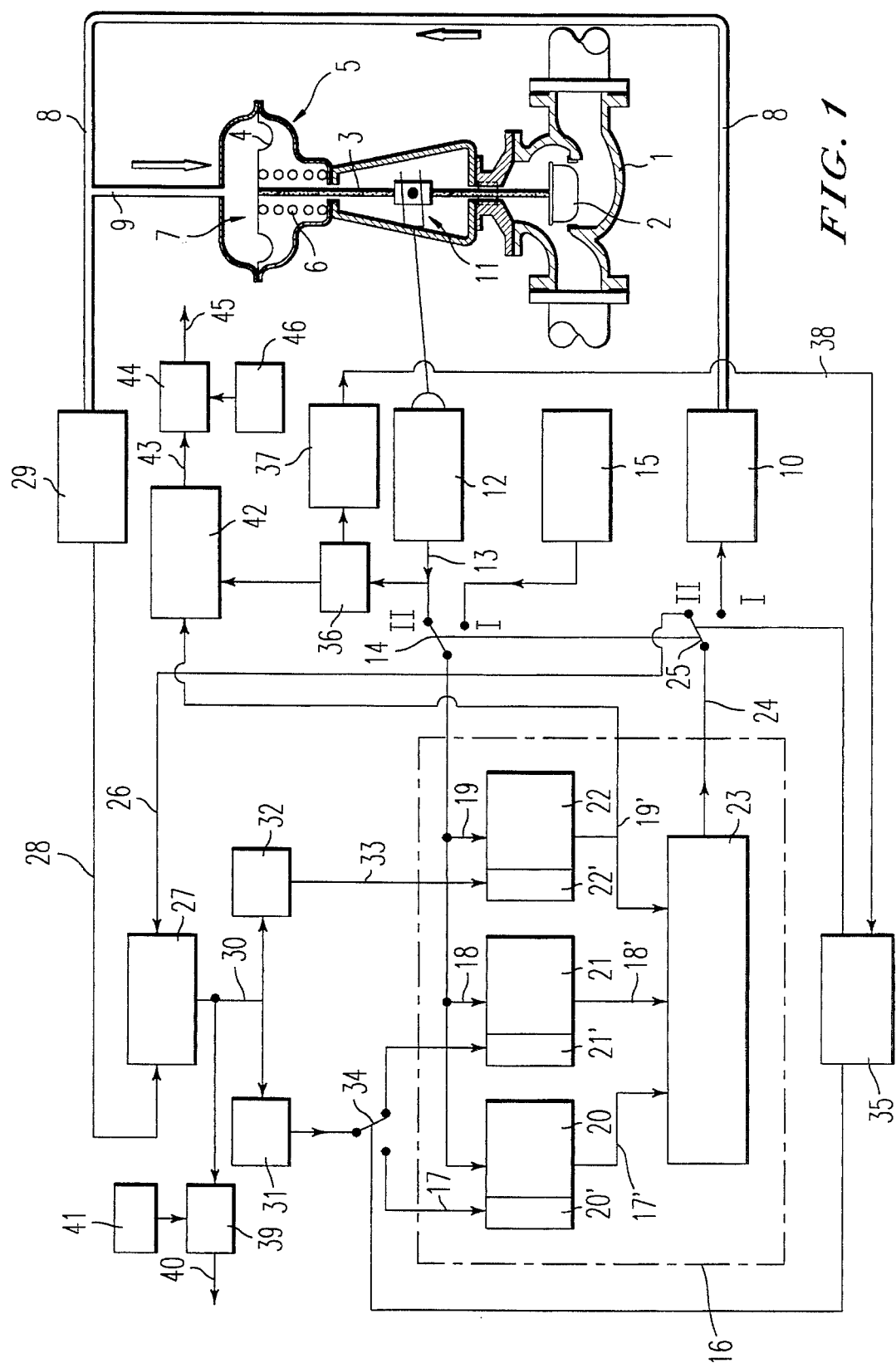

US005538036A

United States Patent [19]

Bergamini et al.

[11] Patent Number: 5,538,036
[45] Date of Patent: Jul. 23, 1996

[54] CONTROL SYSTEM FOR A PNEUMATIC VALVE ACTUATOR

[75] Inventors: Giorgio Bergamini; Venanzio Mininni, both of Bari, Italy

[73] Assignee: Nuovo Pignone S.p.A., Florence, Italy

[21] Appl. No.: 359,517

[22] Filed: Dec. 20, 1994

[30] Foreign Application Priority Data

Dec. 22, 1993 [IT] Italy .................. MI93A2695

[51] Int. Cl.⁶ .................................. F16K 37/00
[52] U.S. Cl. ..................... 137/552; 137/85; 137/551
[58] Field of Search ................ 137/85, 551, 552

[56] References Cited

U.S. PATENT DOCUMENTS

| | | |
|---|---|---|
| 4,637,002 | 1/1987 | Sallas . |
| 4,896,101 | 1/1990 | Cobb . |
| 4,976,144 | 12/1990 | Fitzgerald . |

FOREIGN PATENT DOCUMENTS

| | | |
|---|---|---|
| 0264032 | 4/1988 | European Pat. Off. . |
| 0315391 | 5/1989 | European Pat. Off. . |
| 0500986 | 9/1992 | European Pat. Off. . |
| WO92/14087 | 8/1992 | WIPO . |
| WO93/24779 | 12/1993 | WIPO . |

OTHER PUBLICATIONS

Advances in Instrumentation and Control, vol. 46, Part 2, 1991, pp. 1175–1185, Ken Beatty, "Intelligent Valve Based Process Sensing and Control".

*Primary Examiner*—Gerald A. Michalsky
*Attorney, Agent, or Firm*—Oblon, Spivak, McClelland, Maier & Neustadt

[57] ABSTRACT

A control system for a pneumatic valve actuator comprising three operating blocks memorizing respectively the values of the spring pressure $p_m$, the counter-thrust pressure $p_c$ and the friction pressure $p_a$ for the various valving member position values, said blocks being connected in parallel and, via a switch, to the valving member position transducer or to the set position generator and connected to the pressure computing block connected via a second switch to the pressure generator or, together with the value read by a transducer for the pressure existing in the actuator, to a differentiator connected to two multiplier units for K and for (1–K) respectively, which are connected to the transit memory of the $p_c$ operating block and to the $p_a$ operating block respectively, the switches being driven by a logic control unit which switches over when the valving member is at rest. Means are provided for sensing anomalies and the extent of wear.

6 Claims, 1 Drawing Sheet

CONTROL SYSTEM FOR A PNEUMATIC VALVE ACTUATOR

This invention relates to a new control system which, using the physical operation model of a operating block valve actuator continuously updated for the variation in friction between the seal members and the valve stem and for the variation in the action of the counteracting spring and in the counter-thrusts on the valving member of the valve, allows, with considerable energy saving, not only fast, simple, reliable, precise and economical adjustment of the actuator pressure to the specific value strictly necessary for achieving the desired positioning of the pneumatic valve, ie the specific required opening or closure of the valve, but also continuous measurement of said friction and said counter-thrusts for use for safety purposes and for maintenance programming.

As is well known, a pneumatic valve actuator comprises substantially a diaphragm with which the valve stem is rigid and on which compressed air, from which the control pressure derives, exerts a force for overcoming the thrust of a preloaded counteracting spring, the friction forces arising between the seal and guide members and the valve stem and the counter-thrust of the fluid on the valving member, and for moving said valving member into the required position.

In the current state of the art, said operating pressure is normally generated by a positioner so as to minimize the instantaneous error existing between the required position of the valving member and that effectively attained and indicated by said positioner, using formulas based on the well known formula composed of the sum of an error proportional term, a derivative term and an integral term (P.I.D. control). In this respect, said instantaneous error is generally caused by the presence of friction and counter-thrusts which alter the relationship, normally linear because of the spring, between the control pressure and the position of the valving member.

Such a known control system for a pneumatic valve actuator properly performs the task of nullifying said instantaneous error and hence of nullifying the disturbances caused by friction and counter-thrusts, but has the drawback of attaining the exact required position substantially by integral action which, being constitutionally slow, requires a considerable operating time with considerable expenditure of operating energy, and further of not operating correctly when a delay exists between the command and the consequent movement of the actuator such as occurs for example when said actuator is distant from the control system, and of not being able to provide information on the extent of said disturbances due to friction and counter-thrusts, a knowledge of which is instead currently required by a new category of so-called intelligent actuators to maintain the state of the guides and seals under control and correspondingly improve the safety of the valve and rationalize its maintenance, and to diagnose sudden abnormalities such as the presence of foreign bodies in the valve body or the very dangerous onset of seizure.

The object of the present invention is to obviate said drawbacks by providing a control system for a pneumatic valve actuator which rapidly achieves the exact required position so achieving considerable energy saving, which also operates at a distance from said actuator and which is able to provide information on the extent of the friction and counter-thrusts.

This is substantially attained by using the physical model of the actuator, the variable parameters of which, consisting substantially of the pressures generated respectively by the friction, the counter-thrusts and the counteracting spring, are continuously and automatically updated and measured.

In other words, the control system for a pneumatic valve actuator comprises the actuator physical model consisting of three operating blocks provided with a transit memory and storing respectively the values of the pressure exerted by the counteracting spring for the various valving member shift or position values, the values of the friction pressure relative to the valve seal members and the valving member guide members for the various valving member shift or position values, these latter pressure values being + or − in sign depending on the direction of movement of the valving member, and the values of the pressure exerted by the counter-thrusts for the various valving member shift or position values, said blocks being driven by the set shift or position value $s_0$ for the valving member, to provide as output the specific values of the pressures generated respectively by the counteracting spring (pm, by the counter-thrusts (pc) and by the friction ($p_a$) for the specific set position, these values when added together in a model computing unit giving the specific pressure value:

$$p = p_m + p_c \pm p_a \tag{1}$$

used to control the valve actuator pressure generator to position the valving member in the set position.

However the aforesaid operating stage achieves its purpose only if variations have not occurred in the effects generated either by the counteracting spring or by the friction or by the counter-thrusts or by combinations thereof, in which case the valving member evidently does not halt in the required position.

To take account of said eventuality, after the valve has reached its uniform state and its valving member has halted, the operating stage is always followed by a correction stage for the actuator physical model. For this purpose the said three blocks are no Longer driven by the set value $s_0$, but by the value of the real position s assumed by the valving member and measured in terms of extent and sign by a position transducer, so that if this latter value is different from the set value so, the three blocks provide as output the values $p_{ms}$, $p_{cs}$ and $p_{as}$ corresponding to the position s and hence generally different from the preceding values, so that said computing unit provides as output a value $p_s$ generally different from the preceding value p of equation (1). This value $p_s$ is not fed to the pressure generator but to a differentiator which compares it with the value of the pressure p existing in the actuator and measured by a pressure transducer, the difference between said values or the error e being arbitrarily divided into the two values Ke and (1−K)e, where K is preferably 0.5, and which are fed to the transit memory of the operating block relative to the counter-thrusts and of the operating block relative to the friction respectively, to modify said $p_{cs}$ and $p_{as}$ values into $(p_{cs}+Ke)$ and $[p_{as}+(1-K)]$, so that the output of said computing unit provides the pressure value:

$$p_{s1} + p_{ms} + (p_{cs}+Ke) \pm [p_{as}+(1-K)] \tag{2}$$

With the correction stage for the actuator physical model terminated at this point. The operating stage is again commenced using equation (2) to control said actuator pressure generator and using the set value so for again driving the three operating blocks, where however the values relative to the counter-thrusts and friction have been corrected by said values Ke and (1−K)e respectively.

In this manner the output of the computing unit provides a pressure value:

$$p' + p_m + (p_{cs}+Ke) \pm [p_{as}+(1-K)] \tag{3}$$

which, when compared in said differentiator with the pressure value $p_{si}$ acting on the actuator, gives rise to a second error $e_2$ which, divided into $Ke_2$ and $(1-Ke_2)$, is used in the next correction stage to modify the pressure values relative to the counter-thrusts and friction respectively for the real measured shift $s_2$ of the valving member by the effect of said pressure (2), and so on until the corrections made to the pressure values relative to the counter-thrusts and friction for said set position $s_0$ do not move the valving member into said position with consequent annulment of the error e. At this point all the corrections made are nullified with the exception of those made for said position so. In other words, only the individual values of the pressures exerted by the counter-thrusts and friction are corrected at any given time for a specific position of the valving member.

From the aforegoing it is apparent that besides assuring that the valving member quickly attains the required position even for any occurring friction and counter-thrust variation as experimental tests have widely demonstrated, such a system also enables said values of the pressures due respectively to friction, to counter-thrusts and to the counteracting spring to be self generated for the various valving member shift or position values, hence meaning that any knowledge of the design data for individual valves can be ignored. Again, as an excessive value for said errors $e_i$, ie the need for excess pressure to attain the required positioning, is an unequivocal indication of a serious abnormality such as the presence of a foreign body generating excess counter-thrust or the onset of seizure representing abnormal friction, it will be apparent that said system can easily both provide security against such abnormalities by simply comparing the error value with a set limiting value, and establish a maintenance program by comparing the value of the work done by the friction forces in generating wear during the movement of the valving member with a set value. Hence, the control system for a pneumatic valve actuator, comprising a generator for generating the control pressure which acts on the actuator diaphragm with which the valve stem is rigid in order to overcome the thrust of the counteracting spring, the friction forces and the counter-thrust on the valving member of the fluid passing through the valve and to move said valving member into the required position, a transducer for the value and sign of the position or shift of said valving member and a generator for generating the set shift or position value for the valving member, is characterised according to the present invention by comprising the actuator physical model consisting of three operating blocks each provided with a transit memory, and of which the first block stores the experimental values $p_m$ of the pressure exerted by said counteracting spring for the various valving member shift or position values, the second stores the experimental values $p_c$ of the pressure exerted by the counter-thrusts for the various valving member shift or position values, and the third stores the experimental values $p_a$ of the friction pressure between the valve seal members and the valving member guide members for the various valving member shift or position values, these latter carrying the sign+or− depending on the direction of movement of the valving member, the inputs of said operating blocks being connected in parallel with each other and respectively to said valving member position or shift transducer or to said set position or shift generator via a first switch, and the outputs of said blocks being connected to the input of a block for computing the pressure for the valving member position in accordance with the equation:

$$p \times p_m + p_c \pm p_a$$

the output of said computing block being connected respectively to the input of a differentiator which also receives the value of the pressure existing in the actuator and read by a pressure transducer, or to said control pressure generator via a second switch which is controlled, together with said first switch, by a logic control unit sensitized by means sensing cessation of valving member movement, the output of said differentiator being fed to two multiplier units for the parameter K and $(1-K)$ respectively, where $K \leq 1$, of which the second multiplier unit is connected to said transit memory of said third operating block whereas the first multiplier unit is connected to the transit memory of said second operating block, means being provided for sensing serious operating anomalies and the extent of wear of the seal members.

If by virtue of process information the effective values of the pressure due to the counter-thrusts for the various valving member shift or position values are already known so than said second operating block stores exact data, according to a further characteristic of the present invention said part Ke of the error e at the output of said first muitiplier unit is no longer fed to the transit memory of said second operating block, but instead to the transit memory of said first operating block in order to modify the values $p_m$ of the pressure exerted by the counteracting spring for the various valving member shift or position values. According to a preferred embodiment of the present invention, said parameter K is assumed equal to 0.5.

According to a further preferred embodiment of the present invention said means for sensing cessation of valving member movement consist of a sensor for sensing the variation in the valving member position or shift, which is interposed between said position or shift transducer and a derivative unit sensing cessation of variation in valving member position or shift with time and hence cessation of valving member movement.

According to a further preferred embodiment of the present invention, said means for sensing serious operating anomalies consist of a comparator connected to the output of said differentiator to provide an alarm each time the input error becomes greater than or equal to a preset threshold value. Finally according to a further preferred embodiment of the present invention said means for sensing the extent of wear of the valve seal members consist of an integrator connected to the output of said third operating block and to the output of said valving member position or shift variation sensor respectively, the output of said integrator being connected to a further integrator which provides an alarm each time the input signal becomes greater than or equal to a further preset threshold value. In this respect, said integrator provides at its output the value of the integral of the product of the friction pressure $p_a$ and the valving member position or shift variation ie the work done by the friction forces, this work being proportional to the wear.

The invention is further clarified hereinafter with reference to the accompanying drawing which illustrates a preferred embodiment thereof by way of non-limiting example only, in that technical or constructional modifications may be made thereto without leaving the scope of the present invention.

In said drawing, the FIGURE represents a schematic block view of a control system for a pneumatic valve actuator, formed in accordance with the invention.

In said FIGURE the reference numeral 1 indicates the body of a pneumatic valve, the valving member 2 of which is rigidly connected by the stem 3 to the diaphragm 4 of the actuator 5 on which there acts, against the action of the counteracting spring 6, the control pressure conveyed into the chamber 7 of the actuator 5 from the pressure generator 10 via the pipes 8 and 9. Said stem 3 is connected via the members 11 to a transducer 12 which hence provides at its output 13 a signal indicative in value and sign of the position or shift of the stem 3 and hence of the valving member 2. Said output 13 is connected to the second way of a two-way switch 14, the first way of which is connected to a generator 15 for the set position or shift value required for the valving member 2. The physical model 16 for the actuator 5 is also connected to said switch 14. The inputs 17, 18 and 19 of the three operating blocks 20, 20 and 22 of said model 16 being connected in parallel. The first (20) of said operating blocks stores the experimental values of the pressures $p_m$ exerted by the counteracting spring 6 for the various position or shift values of the valving member 2, the second (21) stores the experimental values of the pressures $p_c$ exerted by the counter-thrusts for the various position or shift values of the valving member 2, and the third (22) stores the experimental values of the friction pressures $p_a$, with a + or − sign according to whether the valving member 2 moves in one direction or the other, for the various position or shift values of the valving member 2. Said operating blocks 20–22 also comprise a transit memory 20', 21', 22' respectively, in which the stored value is algebraically added to the values stored in the blocks to modify these latter values, their outputs 17', 18'and 19' being connected to a computing block 23 which determines the pressure value for the specific position of the valving member 2 by the equation:

$$p=p_m+p_c \pm p_a$$

The output 24 of said computing block 23 is connected to a second two-way switch 25, identical to the switch 14 and acting synchronously with it, its first way being connected to said control pressure generator 10 and its second way being connected, via the cable 26, to the input of a differentiator 27, to which the value of the pressure in the chamber 7 of the actuator 5 and read by the pressure transducer 29 is fed via the cable 28. The output 30 of the differentiator 27, where the pressure error e is present, is connected to two multiplier units 31 and 32 for K and for (1−K) respectively, where $K \leq 1$ and preferably equals 0.5.

The unit 32 is connected via the cable 33 to the transit memory 22' of the operating block 22, and the unit 31 is connected to the transit memory 21' of the operating block 21 However if the effective values of the pressures $p_c$ due to the counter-thrusts are already exactly known, the corrections are made to the values of the pressures $p_m$ due to the counteracting spring 6 and hence the unit 31 is connected to the transit memory 20' of the operating block 20. The further switch 34 is provided for this purpose.

The two said switches 14 and 25 are controlled by a logic control unit 35 which switches over at each stoppage of the valving member 2 identified by a sensor 36 sensing the variation in position of the valving member 2, which is fed by said position transducer 12 to in its turn feed a derivative unit 37 which, when variation in the position of the valving member 2 with time teases, ie when the valving member is at rest, excites said logic control unit 35 via the cable 38.

To detect serious operating anomalies, the output 30 of said differentiator 27 is also connected to a comparator 39 which provides an alarm output 40 every time the input error e becomes greater than or equal to a threshold value preset by the unit 41. Measuring the extent of wear of the valve seal members is achieved by an integrator 42 which is connected to the output 19' of said third operating block 22 and to she output of said sensor 36 sensing the variation in position of the valving member 2, to provide at its output 43 a signal proportional to the work done by the friction forces and hence to the wear, this signal being fed to the comparator 44 to provide an alarm 45 each time it becomes greater than or equal to a threshold value preset by the unit 46.

What is claimed is:

1. A control system for a pneumatic valve actuator, comprising a generator for generating control pressure which acts on an actuator diaphragm with which a valve stem is rigid in order to overcome trust of a counteracting spring, friction forces and counter-thrust on a valving member of fluid passing through a valve and to move said valving member into a required position, a transducer for a value and a sign of a position or a shift of said valving member and a generator for generating a set position or a shift value for the valving member, characterised by comprising an actuator physical model consisting of three operating blocks each provided with a transit memory, and of which a first block stores experimental values $P_m$ of pressure exerted by said counteracting spring for various valving member shift or position values, a second stores experimental values $p_c$ of pressure exerted by counter-thrusts for the various valving member shift or position values, and a third stores experimental values $P_a$ of friction pressure between valve seal members and valving member guide members for the various valving member shift or position values, these latter carrying a sign + or − depending on a direction of movement of the valving member, inputs of said operating blocks being connected in parallel with each other and respectively to said valving member position or shift transducer or to said set position or shift generator via a first switch, and outputs of said blocks being connected to the input of a block for computing the pressure for the valving member position in accordance with the equation:

$$p=p_m+p_c \pm p_a$$

an output of said computing block being connected respectively to an input of a differentiator which also receives a value of pressure existing in the actuator and read by a pressure transducer, or to said control pressure generator via a second switch which is controlled, together with said first switch, by a logic control unit sensitized by means sensing cessation of valving member movement, an output of said differentiator being fed to two multiplier units for a parameter K and (1−K) respectively, where $K \leq 1$, of which a second multiplier unit is connected to said transit memory of said third operating block whereas a first multiplier unit is connected to the transit memory of said second operating block, means being provided for sensing serious operating anomalies and an extent of wear of the seal members.

2. A control system for a pneumatic valve actuator as claimed in claim 1, characterised in that an output of said first multiplier unit is no longer fed to the transit memory of said second operating block, but instead to the pneumatic of said first operating block.

3. A control system for a pneumatic valve actuator as claimed in claim 1, characterised in than said parameter K is assumed equal to 0.5.

4. A control system for a pneumatic valve actuator as claimed in claim 1, characterised in that said means for sensing cessation of valving member movement consist of a sensor for sensing the variation in the valving member position or shift, which is interposed between said position or shift transducer and a derivative unit sensing cessation of variation in valving member position or shift with time and hence cessation of valving member movement.

5. A control system for a pneumatic valve actuator as claimed in claim 1, characterised in that said means for sensing serious operating anomalies consist of a comparator connected to the output of said differentiator to provide an alarm each time an input error e becomes greater than or equal to a preset threshold value.

6. A control system for a pneumatic valve actuator as claimed in claim 1, characterised in that said means for sensing the extent of wear of the valve seal members consist of an integrator connected to the output of said third operating block and to the output of said valving member position or shift variation sensor respectively, the output of said integrator being connected to a further comparator which provides an alarm each time the input signal becomes greater than or equal to a further preset threshold value.

* * * * *